US012566644B2

(12) United States Patent
Jiang et al.

(10) Patent No.: US 12,566,644 B2
(45) Date of Patent: Mar. 3, 2026

(54) WORKFLOW OPTIMIZATION AND RE-DISTRIBUTION

(71) Applicant: International Business Machines Corporation, Armonk, NY (US)

(72) Inventors: Peng Hui Jiang, Beijing (CN); Zhi Li Guan, Beijing (CN); Jun Su, Beijing (CN); Kun Yang, Beijing (CN); Yun Diao, Beijing (CN); Shi Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 17/809,570

(22) Filed: Jun. 29, 2022

(65) Prior Publication Data

US 2024/0004723 A1     Jan. 4, 2024

(51) Int. Cl.
*G06F 9/50*          (2006.01)
*G06N 5/02*          (2023.01)
(52) U.S. Cl.
CPC .......... *G06F 9/5088* (2013.01); *G06F 9/5066* (2013.01); *G06N 5/02* (2013.01)
(58) Field of Classification Search
None
See application file for complete search history.

(56) References Cited

U.S. PATENT DOCUMENTS

| | | | |
|---|---|---|---|
| 8,078,487 B2 | 12/2011 | Li | |
| 8,145,595 B2 | 3/2012 | Kloppmann | |

| | | | | |
|---|---|---|---|---|
| 8,869,165 B2 | 10/2014 | Dasgupta | | |
| 2014/0122505 A1* | 5/2014 | Kudo | .................. | G06F 16/3346 |
| | | | | 707/736 |
| 2019/0303819 A1 | 10/2019 | Lem | | |
| 2020/0004903 A1 | 1/2020 | Gottin | | |
| 2020/0057675 A1* | 2/2020 | Dias | ....................... | G06N 3/086 |

FOREIGN PATENT DOCUMENTS

| | | |
|---|---|---|
| CN | 104239141 | 7/2017 |

OTHER PUBLICATIONS

Ahmad et al., "Data-Intensive Workflow Optimization Based on Application Task Graph Partitioning in Heterogeneous Computing Systems", 2014 IEEE Fourth International Conference on Big Data and Cloud Computing, 9 pages.

(Continued)

*Primary Examiner* — Eric C Wai
(74) *Attorney, Agent, or Firm* — Jordan T. Schiller

(57)          ABSTRACT

Workflow optimization and re-distribution involves a target task set that is determined from a plurality of tasks in a workflow and based on a data flow of the workflow. The target task set is re-distributed to obtain at least one re-distributed task set. Each re-distributed task set indicates a respective data path different from a data path of the target task set and has a same function as the target task set. A simulated data flow for the at least one re-distributed task set is obtained by simulating data flowing in at least one data path indicated by the at least one re-distributed task set. An optimized task set for the target task set is determined based on the simulated data flow for the at least one re-distributed task set.

20 Claims, 11 Drawing Sheets

(56)     References Cited

OTHER PUBLICATIONS

Khalili et al., "Optimal scheduling workflows in cloud computing environment using Pareto-based Grey Wolf Optimizer", Special Issue Paper, Wiley, Accepted: Oct. 13, 2016, Concurrency Computat: Pract Exper 2017, 11 pages.

Konjaang et al., "Multi-objective workflow optimization strategy (MOWOS) for cloud computing", Konjaang and Xu Journal of Cloud Computing: Advances, Systems and Applications (2021), 19 pages.

Mell et al., "The NIST Definition of Cloud Computing", NIST National Institute of Standards and Technology U.S. Department of Commerce, Special Publication 800-145, Sep. 2011, 7 pages.

* cited by examiner

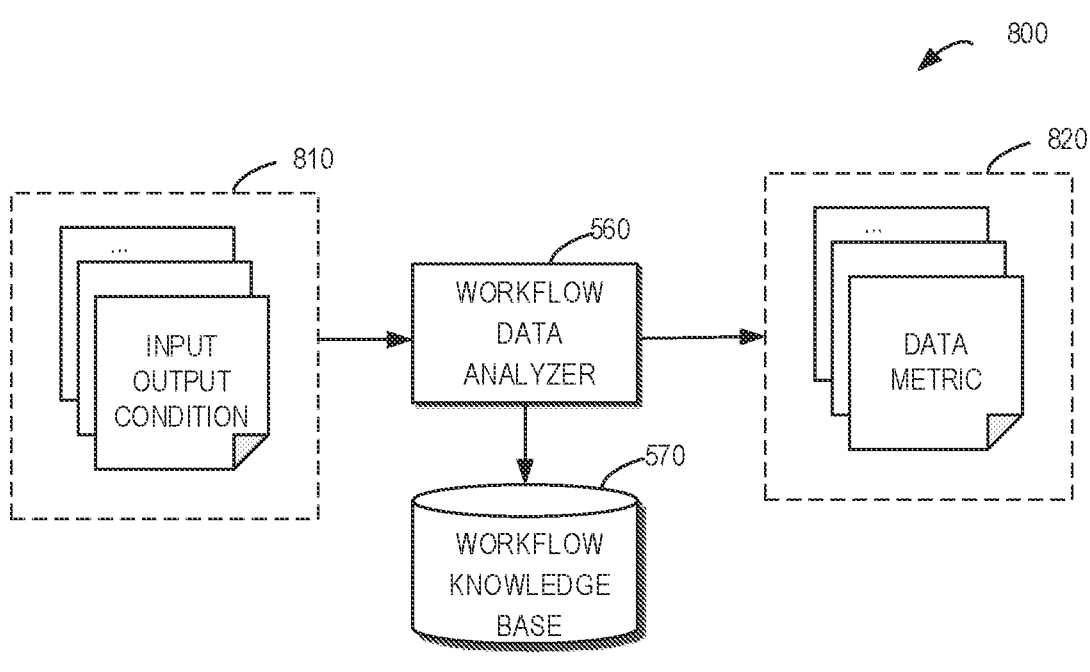

FIG. 8

```
{
  workflow_name: load_request
  task_name: Input_Load_form
  lane: Customer
  input: {

}
  output: {
    requester: String
    requester_amount: Decimal
    requester_address: String
    purpose: String
    mortgage: String
    mortgage_proof: Object
  }
  implementation_type:  "form"
  implementation:{
    form: String
  }
}
```

900

```
{
  workflow_name: request_loan
  task_name: Input_Load_form
  lane: Customer
  input: {

}
  output: {
    requester: String
    requester_amount: Decimal
    requester_address: String
    purpose: String
    mortgage: String
    mortgage_proof: Object
    request_date: Date
    requester_ID: String
  }
  implementation_type:  "form"
  implementation:{
    form: String
  }
}
```

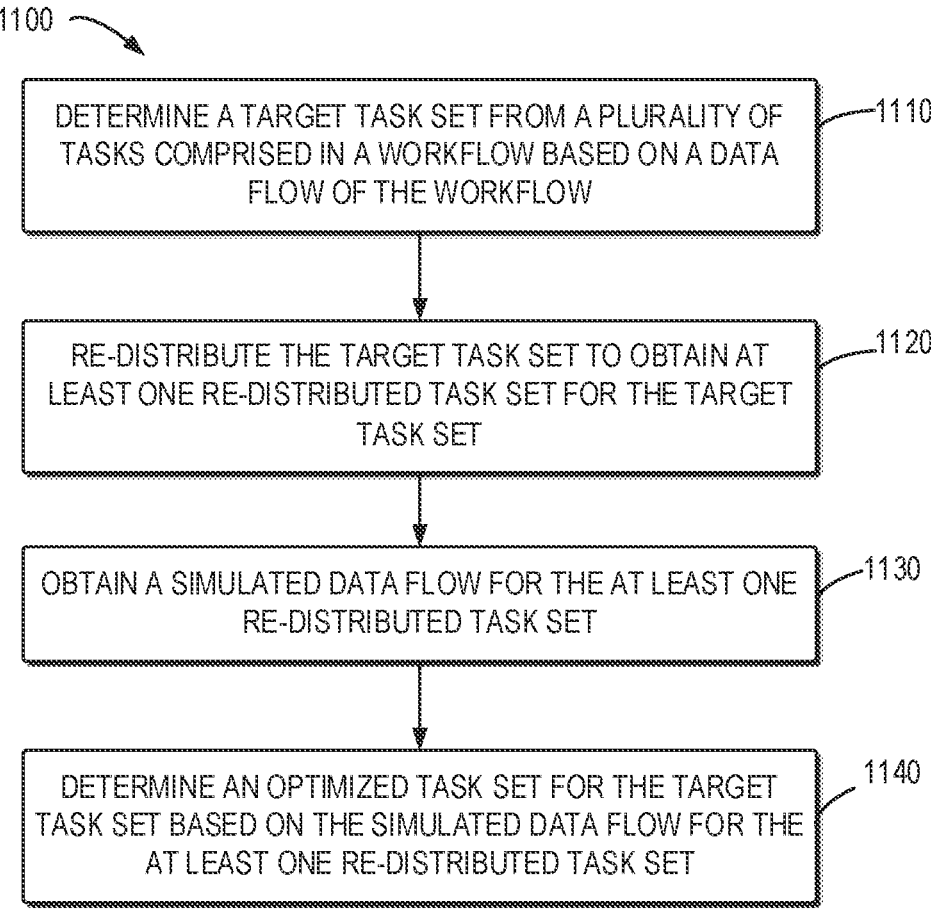

DETERMINE A TARGET TASK SET FROM A PLURALITY OF TASKS COMPRISED IN A WORKFLOW BASED ON A DATA FLOW OF THE WORKFLOW — 1110

RE-DISTRIBUTE THE TARGET TASK SET TO OBTAIN AT LEAST ONE RE-DISTRIBUTED TASK SET FOR THE TARGET TASK SET — 1120

OBTAIN A SIMULATED DATA FLOW FOR THE AT LEAST ONE RE-DISTRIBUTED TASK SET — 1130

DETERMINE AN OPTIMIZED TASK SET FOR THE TARGET TASK SET BASED ON THE SIMULATED DATA FLOW FOR THE AT LEAST ONE RE-DISTRIBUTED TASK SET — 1140

FIG. 11

WORKFLOW OPTIMIZATION AND RE-DISTRIBUTION

BACKGROUND

The present invention relates to computer science techniques, and more specifically to workflow optimization and re-distribution.

Typically, workflow applications have been widely used in a variety of applications, such manufacturing a product, providing a service, processing information or any other value-generating activity. Workflow applications coordinate work between tasks performed by humans and automated tasks to improve daily business operations and to improve productivity. A workflow can be defined as a simple series of individual tasks and can be generally presented visualized with diagram or checklist. By organizing a series of tasks for a process into a workflow, the process can be simplified and repeatable. However, when deploying the workflows, the workflows will typically encounter some bottlenecks.

SUMMARY

According to an embodiment of the present invention, there is provided a computer-implemented method. According to the method, one or more processors determine a target task set from a plurality of tasks comprised in a workflow based on a data flow of the workflow. One or more processors re-distribute the target task set to obtain at least one re-distributed task set for the target task set. Each re-distributed task set indicates a respective data path different from a data path of the target task set. The at least one re-distributed task set has a same function as the target task set. One or more processors obtain a simulated data flow for the at least one re-distributed task set by simulating data flowing in at least one data path indicated by the at least one re-distributed task set. One or more processors determine an optimized task set for the target task set based on the simulated data flow for the at least one re-distributed task set.

According to a further embodiment of the present invention, there is provided a system. The system comprises a processing unit; and a memory coupled to the processing unit and storing instructions thereon. The instructions, when executed by the processing unit, perform acts of the method according to the embodiments of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiments of the present disclosure.

BRIEF DESCRIPTION OF THE DRAWINGS

FIG. 8 depicts example architecture for workflow data analysis according to some embodiments of the present disclosure;

FIG. 9 depicts example task data structures according to some embodiments of the present disclosure;

FIG. 11 depicts a flowchart of an example method for workflow optimization and re-distribution according to some embodiments of the present disclosure.

DETAILED DESCRIPTION

Figure 1:
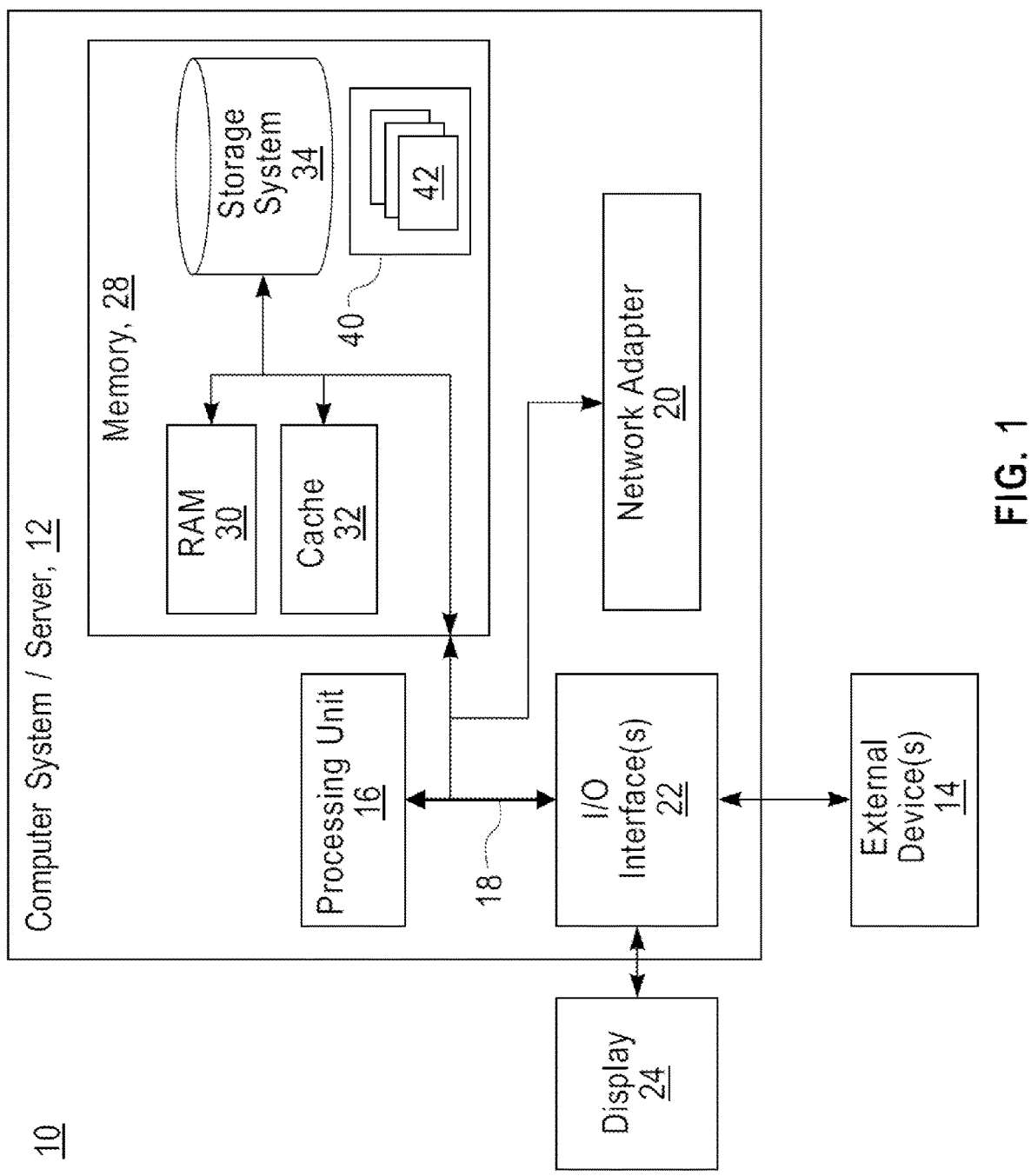
FIG. 1 depicts a cloud computing node according to an embodiment of the present invention.

Some embodiments will be described in more detail with reference to the accompanying drawings, in which the embodiments of the present invention have been illustrated. Embodiments of the present invention can be implemented in various manners and therefore should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
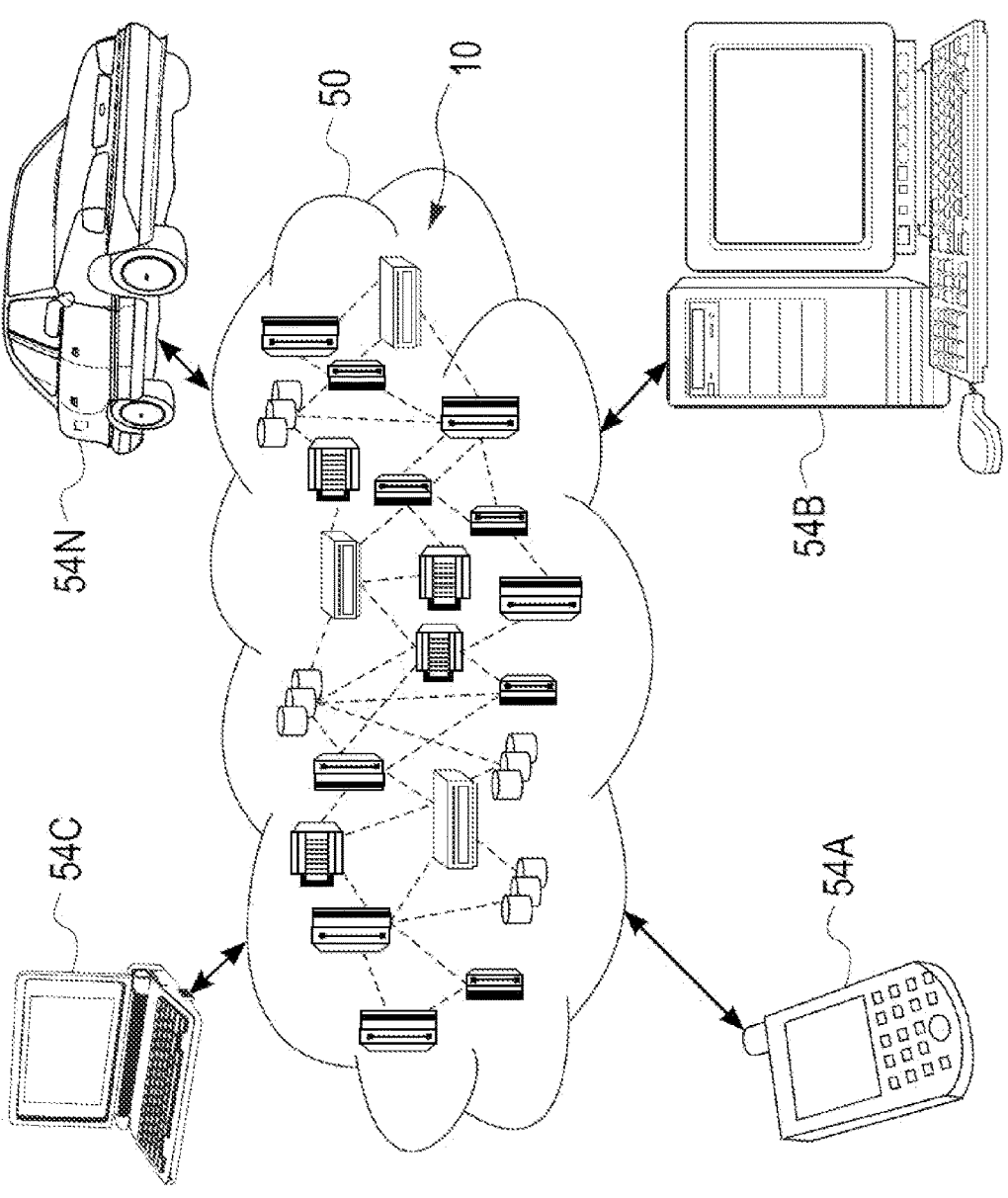
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
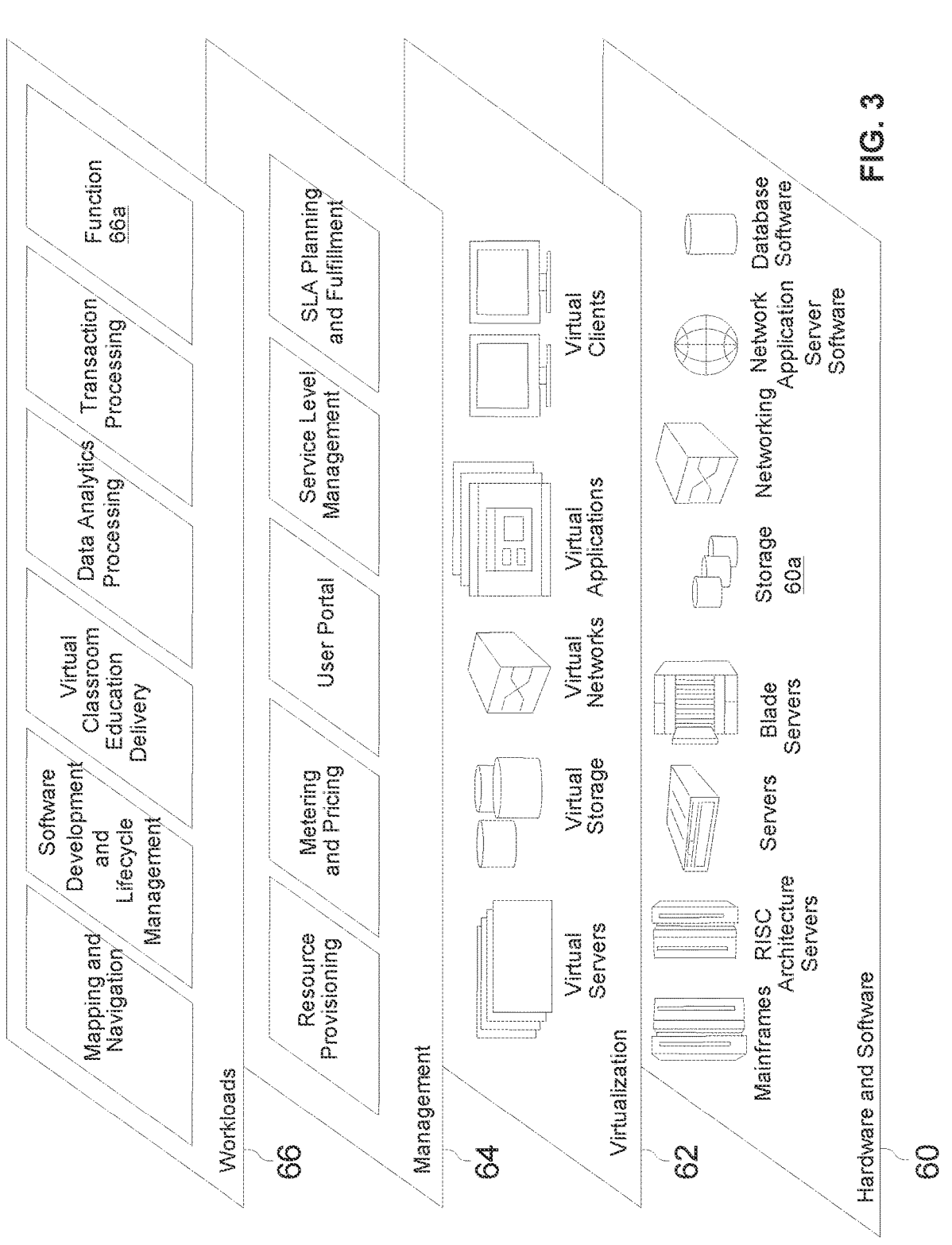
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow re-distributing 96. The functionalities of workflow re-distributing 96 will be described in the following embodiments of the present disclosure.

As mentioned, workflow applications coordinate work between tasks performed by humans and automated tasks to improve daily business operations and to improve productivity. Workflow management, such as finding redundant tasks, mapping out the workflow in an ideal state, automating the process and identifying bottlenecks or areas for improvement, creates and optimizes paths for data in order to complete items in each process. However, although using workflows may improve productivity, it still has several problems.

One problem is that it is difficult to estimate and control utilization of resources if the workflow(s) is not deployed. That is, resources may be improperly utilized or over utilized. If a resource is over utilized, budget constraints may make tasks cost prohibitive or render the resource ineffective altogether. Improper utilization of resources makes a service provider less competitive and unable to take on additional workflow.

Another problem is that when managing different workflows with similar tasks is that those similar tasks shared by those different workflows cannot be taken into consideration. There may be several similar tasks in different workflows being developed by different teams or developers. For example, two different departments both have the purchase approval workflow while their implementation would be most likely the same. Their pattern and experience can be shared. However, such similar pattern or experience has not been considered in conventional workflow management.

There is still a further problem in that some activities may be CPU intensive or I/O intensive. These CPU intensive or I/O intensive activities may cause potential bottlenecks. There lacks an efficient way to optimize or re-distribute these activities before deployment to avoid bottleneck in the workflow.

Therefore, it is desirable to optimize and re-distribute the workflows more efficiently.

According to some embodiments of the present invention, there is an improved solution for workflow optimization and re-distribution. In this solution, a target task set is selected from a plurality of tasks included in a workflow based on a data flow of the workflow. For example, the target task set may be selected based on similarity analysis among the plurality of task sets. At least one re-distributed task set is obtained by re-distributing the target task set. An optimized task set for the target task set can be determined by simulating a data flow for the at least one re-distributed task set.

In this way, the task set in the workflow can be optimized based on data flow simulation and analysis. Therefore, the resource can be better utilized for workflow execution. Potential bottlenecks may also be avoided. In addition, optimized workflow can be efficiently shared without a potential security risk.

Figure 4:
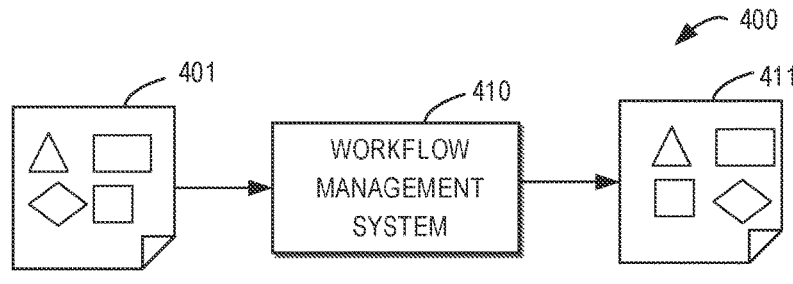
FIG. 4 depicts a block diagram of an environment for workflow optimization and re-distribution according to some embodiments of the present disclosure.

Reference is first made to FIG. 4 which depicts a block diagram of an environment 400 for workflow optimization and re-distribution according to some embodiments of the present disclosure.

As illustrated in FIG. 4, environment 400 includes a workflow management system 410. In some embodiments, the workflow management system 410 may be implemented by computer system/server 12 of FIG. 1 or by multiple computer systems/servers in a distributed manner.

In environment 400, a workflow management system 410 is configured to perform workflow management such as workflow optimization or re-distribution on a source workflow 401 to obtain a target workflow (also referred to as optimized workflow or re-distributed workflow) 411. The target workflow 411 may have a same or similar function as the source workflow 401. The source workflow 401 and the target workflow 411 may comprise a plurality of tasks, respectively. A task refers to a unit of work to be performed on a workflow. The task is characterized by several attributes such as input data and output data. The attributes of the task will be described in detail below.

The source workflow 401 and the target workflow 411 may be any suitable type of workflow. Examples of workflow includes but not limited to industrial workflow, business workflow, medical workflow, individual workflow, etc. It is to be understood that the workflow management system 410 may have further functions such as finding redundant tasks, mapping out the workflow in an ideal state, automating the workflow, identifying bottlenecks or areas for improvement, etc. The scope of the present disclosure will not be limited in this regard. The workflow management system 410 may also create and optimize the paths for data in order to complete items in each process.

Figure 5:
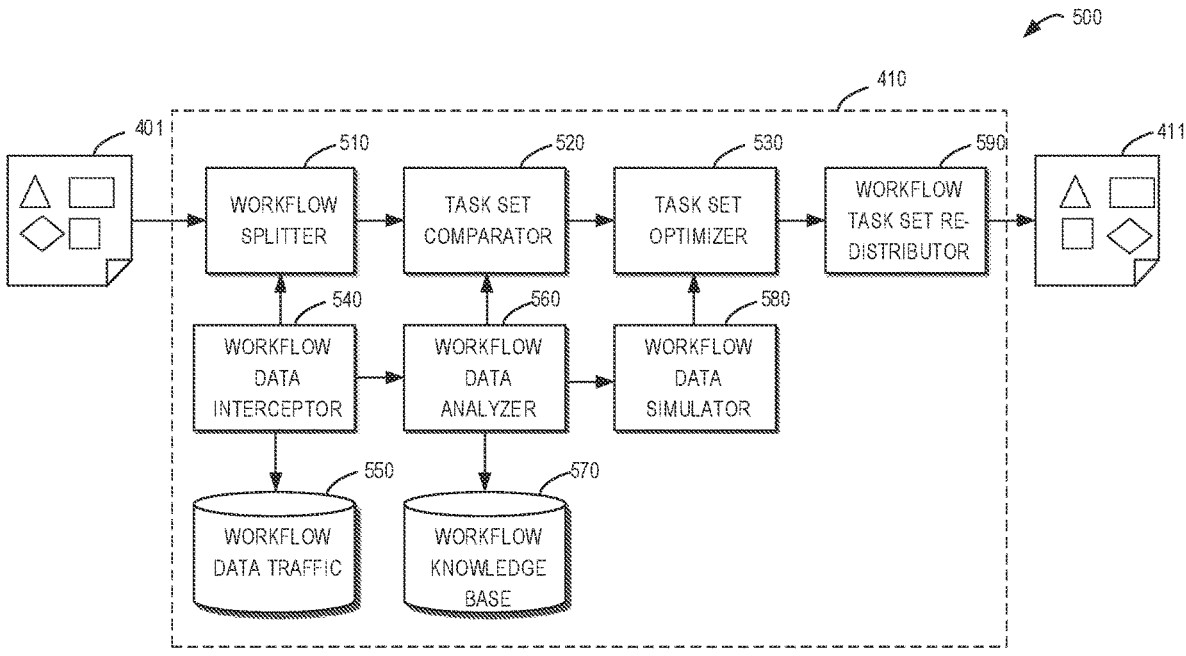
FIG. 5 depicts a block diagram of architecture for workflow optimization and re-distribution according to some embodiments of the present disclosure.

With reference now to FIG. 5, which depicts a block diagram of architecture 500 for workflow optimizing and re-distributing according to some embodiments of the present invention. For the purpose of illustration, the architecture 500 of FIG. 5 is evolved from environment 400 in FIG. 4.

FIG. 5 illustrates some embodiments of workflow optimizing or re-distributing from the source workflow 401 to the target workflow 411.

As illustrated in FIG. 5, the workflow management system 410 may comprise a plurality of modules. Each module may be configured to perform a particular function. For example, a workflow splitter 510 may be configured to split the source workflow 401 into task sets. A task set is a combination of multiple tasks with relationships among these tasks. Examples of relationships comprise but not limited to sequential relationship, conditional relationship, parallel relationships and others.

In some embodiments, the workflow splitter 510 is configured to group the plurality of tasks of the source workflow 401 into a plurality of task sets based on data flow of the source workflow 401 and a knowledge base. The data flow of the source workflow 401 may comprise at least one of the following information: input data, output data, pre-conditions, post-conditions, timeline information and resource consumption information of tasks in the source workflow 401. Details regarding these data and information will be described below.

In some embodiments, the workflow management system 410 includes a workflow data interceptor 550. Examples of the workflow data interceptor 550 may includes a Workflow Gateway Sidecar. The workflow data interceptor 550 is configured to intercept a request to perform a task or a task set in the source workflow 401 and collect input data and output data along with additional data such as conditions or pattern data, etc. The workflow data interceptor 540 may transmit the collected data to a workflow data analyzer 560 comprised in the workflow management system 410 for further analysis. Details regarding the workflow data analyzer 560 will be described below. In some embodiments, the workflow data interceptor 540 may also transmit the collected data to workflow data traffic storage 550.

Figure 6:
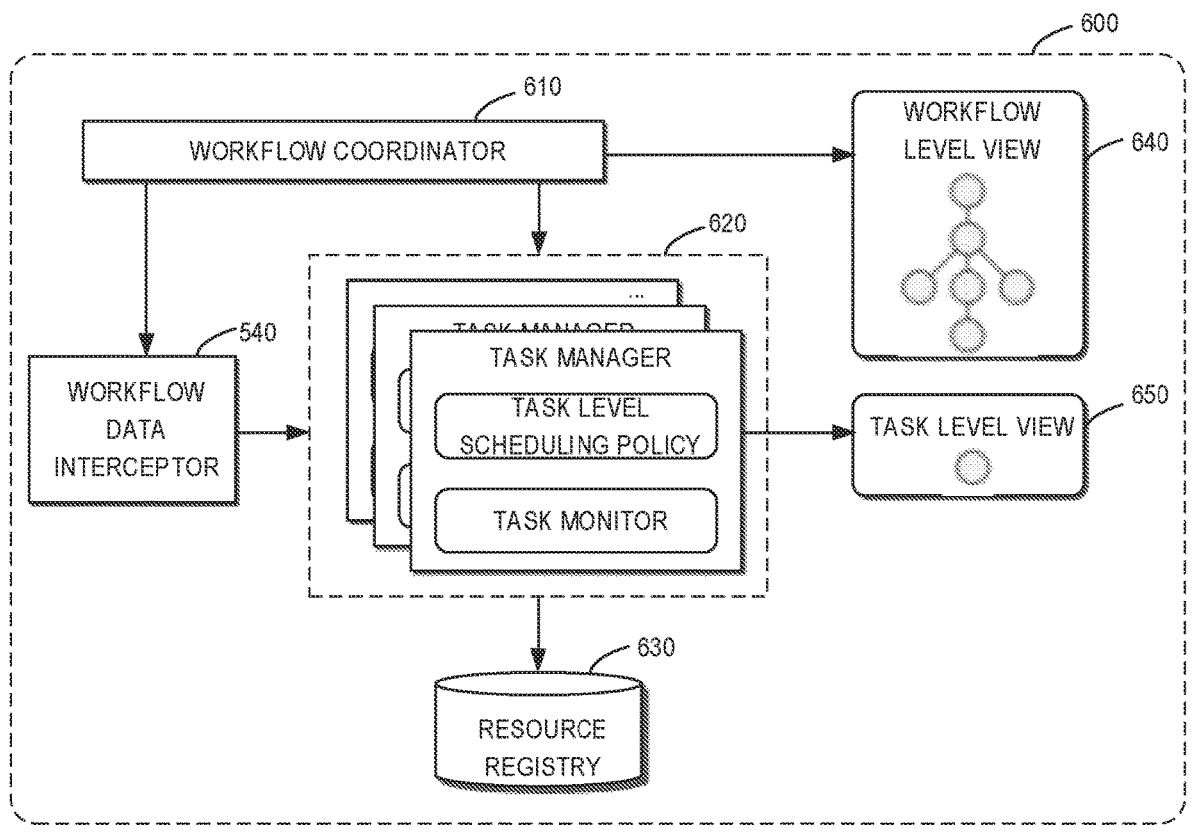
FIG. 6 depicts example architecture of workflow management system with a workflow data interceptor according to some embodiments of the present disclosure.

FIG. 6 depicts example architecture 600 of workflow management system 410 with a workflow data interceptor 540 according to some embodiments of the present invention. In architecture 600, workflow management system 410 may further include workflow coordinator 610, one or more task managers 620 and resource registry 630. The workflow coordinator 610 is configured to coordinate one or more workflows in the workflow management system 410. The workflow coordinator 610 may also provide a workflow level view 640. The task manager 620 is configured to manage the task. For example, the task manager 620 may monitor the task and provide a task level scheduling policy. The task manager 620 may provide a task level view 650. The resource registry 630 is configured to store and register resource information of each task. In some embodiments, the workflow data interceptor 540 is configured to collect information from the workflow coordinator 610 and from each task manager 620. The workflow data interceptor 540 may transmit the collected data to a workflow data analyzer 560 comprised in the workflow management system 410 for further analysis.

Refer back to FIG. 5. Alternatively, or in addition to, in some embodiments, workflow splitter 510 is structured and configured to group the plurality of tasks of the source workflow 401 into a plurality of task sets based on operators of the plurality of tasks or functions of the plurality of tasks. Information regarding the operators and the functions of the tasks will be collected for example by workflow data interceptor 540.

In some embodiments, to split the source workflow 401 to the plurality of task sets, workflow splitter 510 may start from the entry task and iterate to extend task set. Workflow splitter 510 will stop when there is a dead loop or a task with different scope. In this way, tasks in one scope may be nested as a task set. It is to be understood that the task set may comprise any suitable number of tasks, such as only one task, two tasks or more than two tasks. Alternatively, the task set will be processed separately.

In some embodiments, the splitting or the grouping of the source workflow 401 will be changed under different task condition. That is, the scope of task set may be changed. For example, for those CPU intensive cases or IO intensive cases, the number of tasks in each task set may be relatively few. That is, the number of task sets split from the source workflow 401 will be relatively large. It is to be understood that the source workflow 401 may be split into any suitable groups of task sets. For example, for those CPU intensive cases, those tasks with large computations will be grouped into different task sets. For another example, for those I/O intensive tasks, those tasks with large throughput will be grouped into different task sets. The scope of the present disclosure will not be limited in this regard.

By splitting the tasks in the source workflow into different task sets, workflow management system 410 may re-distribute the source workflow by re-distributing a task set in the source workflow instead of the whole source workflow. In this way, the re-distributing of workflow may be simplified.

Figure 7A:
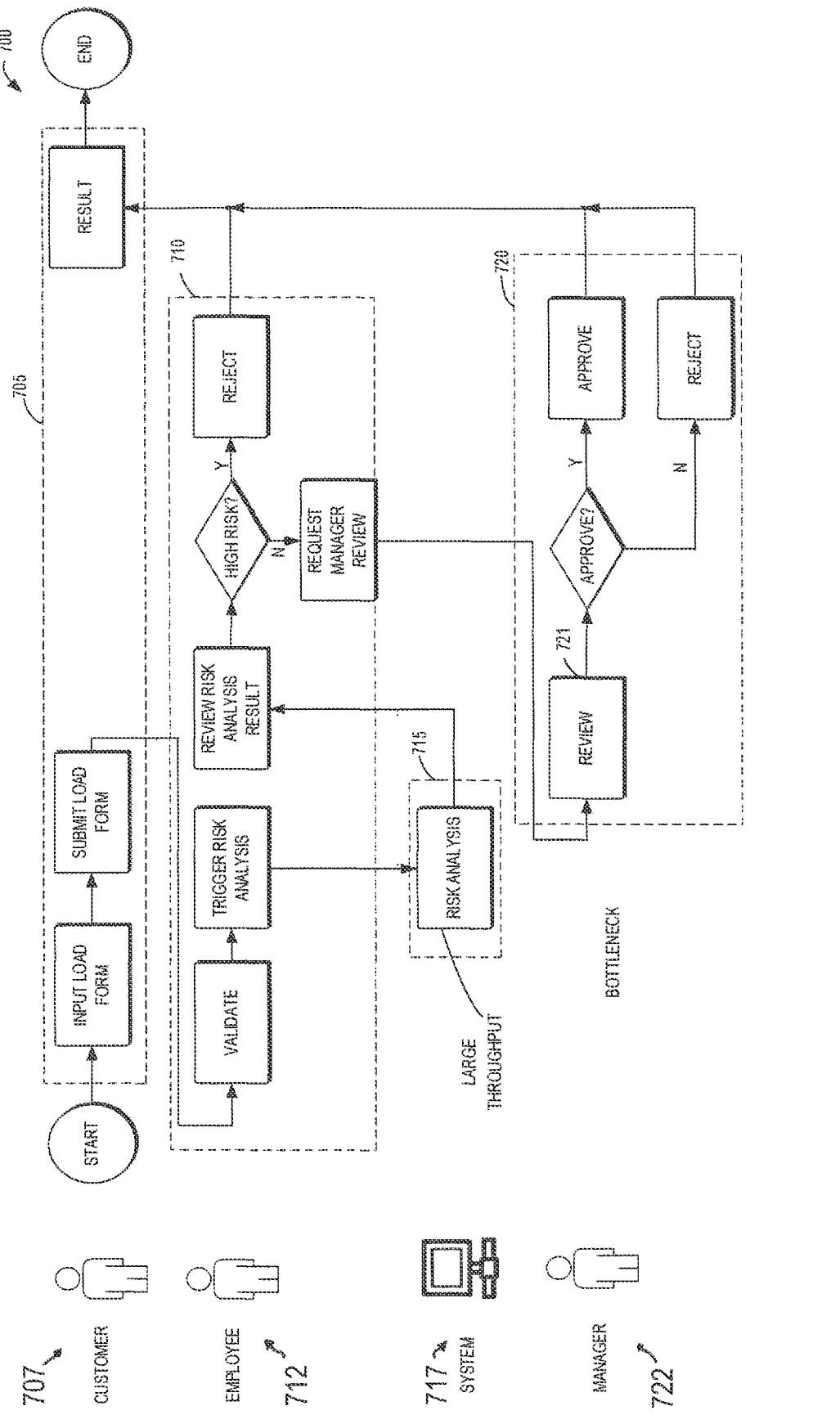
FIG. 7A depicts example task sets of a workflow according to some embodiments of the present disclosure.

FIG. 7A depicts example task sets of a source workflow 700 according to some embodiments of the present disclosure. The workflow 700 relates to several tasks for managing a load form performed by operators including customer 707, employee 712, system 717, and manager 722. In the example of FIG. 7A, source workflow 700 is split into task set 705, task set 710, task set 715 and task set 720 according to the various operators of tasks, 707, 712, 717, and 722, in the source workflow 700. Each task set may comprise at least one task. In FIG. 7A and the following FIGS. 7B and 7C, each task may be represented by a block.

For example, the tasks to be performed by a customer may be grouped in the task set 705. The task set 705 comprises a task to input load form by a customer, a task to submit load form by the customer and a task to determine the result by the customer. The tasks to be performed by an employee may be grouped in the task set 710. The task set 710 includes a task to validate the load form by an employee, a task to trigger a risk analysis by the employee, a task to review the risk analysis result by the employee, a task to reject the load form by the employee and a task to request a manager review by the employee. The task(s) to be performed by the system may be grouped in the task set 715. The task set 715 may include a task for risk analysis by the system. The tasks to be performed by a manager may be grouped in the task set 720. The task set 720 includes task 721 to review the load form by a manager, a task to determine whether to approve the load form by the manager, a task to approve the load form by the manager and a task to reject the load form by the manager.

As illustrated, the task set 715 comprises only one task which involves a large throughput. Thus, the subsequent task 721 in the task set 720 may be a bottleneck in the workflow 700. The workflow management system 410 may redistribute the task set 720 to avoid the bottleneck.

Figure 7B:
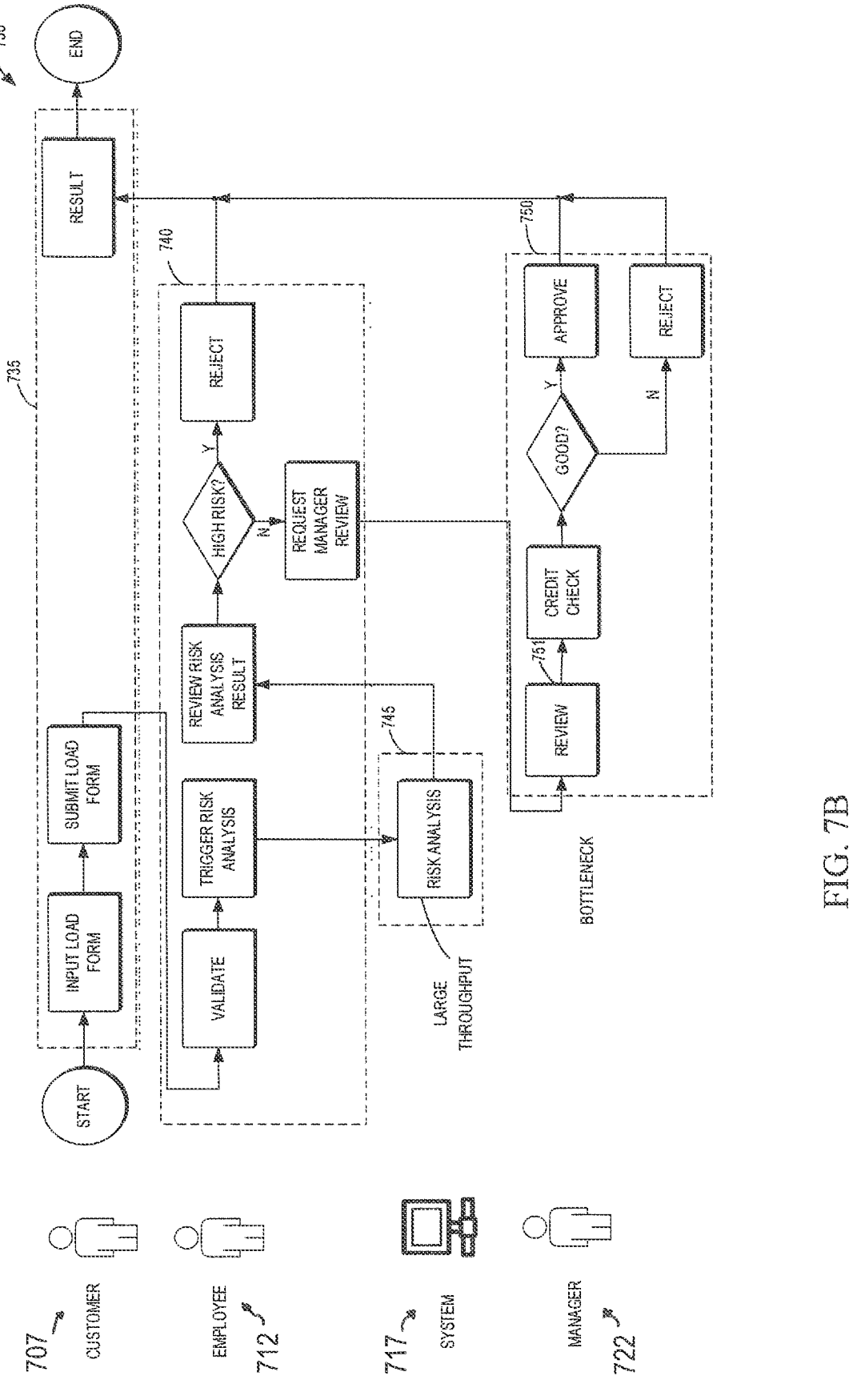
FIG. 7B depicts further example task sets of a workflow according to some embodiments of the present disclosure.

FIG. 7B depicts further example task sets of a source workflow 730 according to some embodiments of the present disclosure. Similar to the workflow 700, workflow 730 relates to several tasks for managing a load form. Similar to FIG. 7A, source workflow 730 in FIG. 7B is split into task set 735, task set 740, task set 745 and task set 750. Task set

745 includes only one task which involves a large throughput. Thus, the subsequent task 751 in the task set 750 may be a bottleneck in the workflow 730. The workflow management system 410 may redistribute the task set 750 to avoid the bottleneck.

As illustrated, source workflow 730 is similar to source workflow 700. The task sets 735, 740 and 745 are same as the task sets 705, 710 and 715, respectively. Details regarding the tasks in the task sets 735, 740 and 745 will not be repeated here. The task set 750 is similar to the task set 720. The task set 750 includes task 751 to review the load form by a manager, a task to perform a credit check by the manager, a task to approve the load form by the manager and a task to reject the load form by the manager. As used hereinafter, two or more same or similar task sets may be referred to as similar task sets. For example, the task sets 705 and 735 are both performed by the customer and are both related to submitting of the load form and determination of the result the load form. In such situation, the task sets 705 and 735 are similar task sets. The task set 720 and task set 750 are both performed by the manager and are both related to the approval of the load form. In such a situation, the task sets 720 and 750 are similar task sets. Details regarding similar task sets will be described in detail with respect to the task set comparator 520 in FIG. 5 below.

Figure 7C:
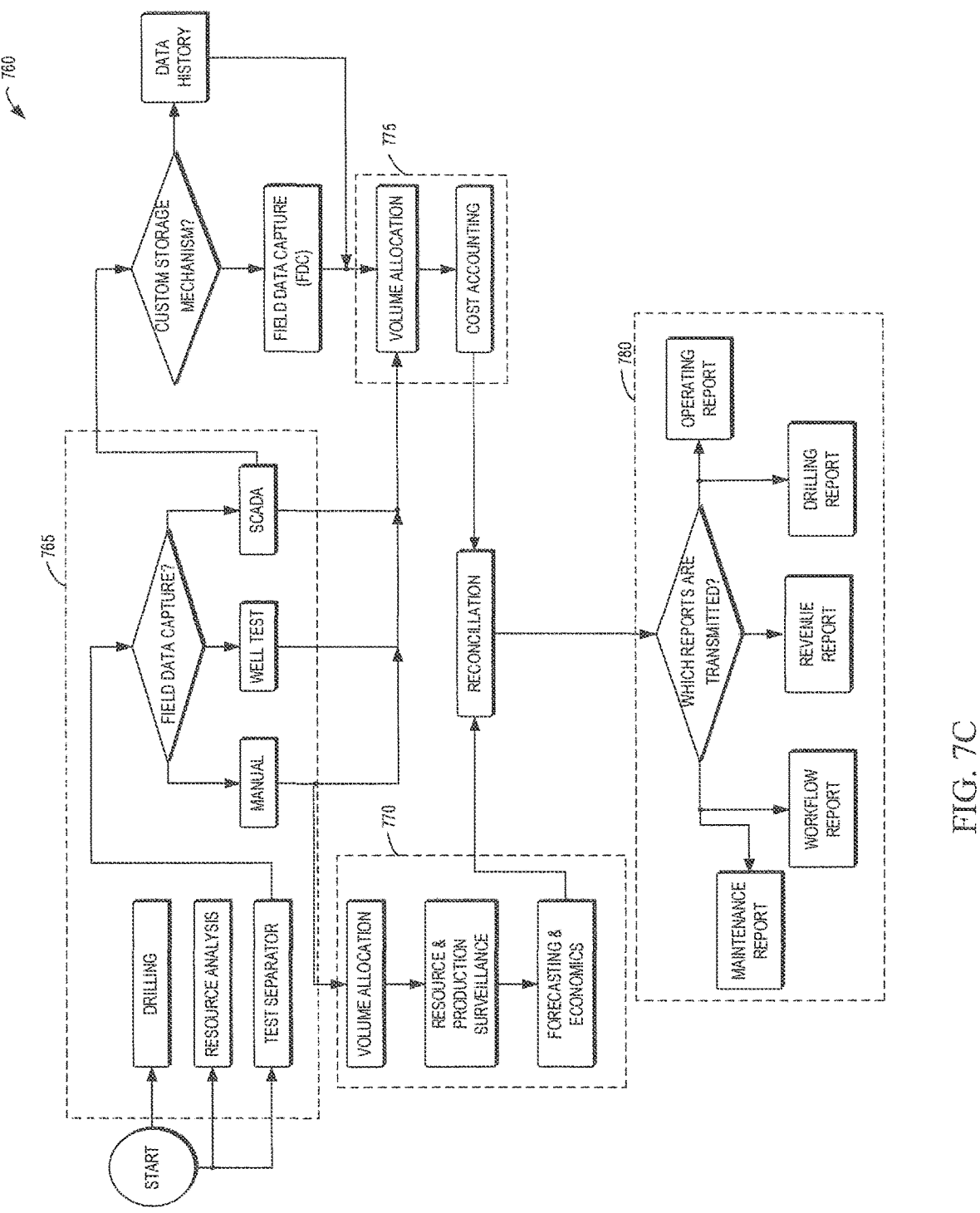
FIG. 7C depicts still further example task sets of a workflow according to some embodiments of the present disclosure.

FIG. 7C depicts still further example task sets of a source workflow 760 according to some embodiments of the present disclosure. Workflow 700 relates to managing and analyzing an oil drilling. In the example of FIG. 7C, source workflow 760 is split into task set 765, task set 770, task set 775 and task set 780 according to functions of tasks in the source workflow 700.

For example, tasks to be used for oil platform operations may be grouped in the task set 765. The task set 765 comprises a task for drilling, a task for resource analysis, a task for test separation, a task for field data capture analysis, etc. Tasks to be used for engineering may be grouped in the task set 770. The task set 770 includes a task for volume allocation, a task for resource and production surveillance, and a task for forecasting and economics analysis. Tasks to be used for accounting the production may be grouped in the task set 775. The task set 775 includes a task for volume allocation and a task for cost accounting. Tasks to be used for production reporting may be grouped in the task set 780. The task set 780 may include a task for maintenance reporting, a task for workflow reporting, a task for revenue reporting, a task for drilling reporting and a task for operating reporting, etc. As illustrated, workflow 760 may also include one or more tasks that are not grouped into the above task sets, for example, a task for data history analysis, a task for reconciliation, etc.

Examples regarding the splitting or grouping of tasks in the source workflow into task sets have been described with respect to FIGS. 7A, 7B, and 7C. It is to be understood that these task sets examples are only for the purpose of illustration, without suggesting any limitations. In some embodiments, with these task sets, the workflow management system 410 selects a target task set from the task sets in the source workflow 401 to be re-distributed.

Referring back to FIG. 5. In some embodiments, based on the grouped different task sets, workflow data interceptor 540 collects a plurality of pairs for input and output data ({task set}, <input, output>). The collected data or collected information will be sent to the workflow data analyzer 560 for data flow analysis. In addition, the workflow data interceptor 540 also transmits the collected data or collected information to the workflow data traffic storage 550 for future usage.

In some embodiments, the workflow data interceptor 540 may scramble sensitive data from the collected data before transmitting the collected data to the workflow data analyzer 560. In this way, sensitive data will be protected to prevent privacy leaks.

As mentioned above, the workflow management system 410 may further include a workflow data analyzer 560 configured to analyze a data flow of the source workflow 401. For example, the workflow data analyzer 560 will receive data flow information from the workflow data interceptor 540. The workflow data analyzer 560 is configured to analyze data of tasks or task sets in the source workflow 401 based on the received data flow information. In some embodiments, workflow data analyzer 560 also transmits the received data flow information to a workflow knowledge base 570 for further usage.

In some embodiments, workflow data analyzer 560 is configured to aggregate a data metric for a task set based on data flow information received from the workflow data interceptor 540. For example, the workflow data analyzer 560 may aggregate a data metric for each task set based at least in part on the input data and output data of the task set, and then transmit the aggregated data metric to the task set comparator 520.

Alternatively, workflow data analyzer 560 may aggregate a data metric for each task set based on the input data, output data and additional data of the task set, and transmit the aggregated data metric to the task set comparator 520. For example, the workflow data analyzer 560 may aggregate a data metric for the task set based on the input data and output data of the task set and additional data such as pre-conditions, post-conditions and task implementations (for example, in the type of "a form") of the task set.

Examples of additional data of the task set may include but not limited to names, descriptions, actions, pre-conditions, post-conditions, attributes, exceptions for the task set. The name is a string of characters uniquely identifying the task set or a task of the task set. The description is a natural language description of the task in the task set. The action is a modification of the environment caused by the execution of the task. Pre-conditions are Boolean expressions that need to be true before the action(s) of the task takes place. Post-conditions are Boolean expressions that need to be true after the action(s) of the task does take place. As used herein, pre-conditions and post-conditions may collectively be referred to as conditions. The attributes provide indications of the type and quantity of resources necessary for the execution of the task, the actors in charge of the tasks, the security requirements, whether the task is reversible or not, and other task characteristics. The exceptions provide information on how to handle abnormal events. The exceptions supported by a task consist of a list of <event, action> pairs.

In addition, workflow data analyzer 560 may obtain data flow timeline information of each task set from the workflow data interceptor 540, and transmit the data flow timeline information to the task set comparator 520. The data flow timeline information may comprise start time for a task in the task set, end time for the time and other temporal information.

FIG. 8 depicts example architecture for workflow data analysis using the workflow data analyzer 560 according to some embodiments of the present disclosure. As illustrated, the workflow data analyzer 560 is configured to receive data flow information (including input data, output data and conditions) 810 for each task set. The data flow information 810 may include a plurality of factors. The workflow data analyzer 560 may aggregate data metrics based on different task sets and conditions. Each data metric includes at least one of the followings: a minimum value or maximum value for each factor, an average or mean value for each factor, a sum or count for each factor, a percentage rank for each factor, etc. The workflow data analyzer 560 is configured to transmit the aggregated data metric 820 (comprising input output aggregation) to the task set comparator 520 and the workflow knowledge base 570.

In some embodiments, the data metric may be in the form of a vector, a multiple dimension matrix or any suitable data structure. FIG. 9 depicts example task data structures 900 and 950 according to some embodiments of the present invention. The data metric may be stored in the form of the task data structure 900 or task data structure 950. Task data structure 900 may represent the task data structure for the task "Input Load form" in the source workflow 700 in FIG. 7A. The task data structure 900 includes input (no input in this case), output, implementation type and other attributes. Likewise, task data structure 950 includes input (no input in this case), output, implementation type and other attributes. In some embodiments, task data structure 950 represents the task data structure for the task "Input Load form" in the source workflow 730 in FIG. 7B. As can be seen from FIG. 9, task data structure 900 is similar to task data structure 950.

Still refer to FIG. 5. The workflow management system 410 includes a task set comparator 520. The task set comparator 520 is configured to determine a target task set based on data flow information such as the aggregated data metrics received from the workflow data analyzer 540. In some embodiments, the task set comparator 520 determines at least one task set grouped by the workflow splitter 510 as candidate task sets based on data flow information and a knowledge base from the workflow knowledge base 570.

The workflow management system 410 further includes task set comparator 520. The task set comparator 520 is configured to select a target task set from the plurality of task sets of the source workflow 401. In some embodiments, task set comparator 520 may determine whether a task or a candidate task set is efficient or a potential bottleneck. The task set comparator 520 may further select a task set with a bottleneck to be the target task set. For example, if a time duration for completing a task set of a plurality of task sets in the source workflow 401 exceeds a time threshold (that is, the task set is a potential bottleneck), the workflow management system 410 may determine the task set as the target task set. Alternatively, if resource consumption for completing a task set exceeds a consumption threshold (that is, the task set is a potential bottleneck), the workflow management system 410 may determine the task set as the target task set. It is to be understood that the time threshold and the consumption threshold may be predetermined or dynamically adjusted according to customer preference or other criteria.

In some embodiments, task set comparator 520 may select the target task set based on other criteria. For example, the task set comparator 520 may receive data flow information such as data metrics from the workflow data analyzer 560 and determine similarities among the plurality of task sets based on the data flow information. For example, with the aggregated data metrics and optional obtained data flow timeline information from the workflow data analyzer 560, the task set comparator 520 may determine the similarities based on the data metrics and the data flow timeline information of the plurality of task sets.

As discussed above, the data metrics may be in the form of vectors or matrixes or task data structure 900 or 950 in FIG. 9. Task set comparator 520 may determine the similarities based on calculations using the data metrics. For example, the task set comparator 520 may determine the pointwise mutual information (PMI) between two tasks s and t by using (1) as described below.

$$f(s,\ t) - \log\left(\frac{\frac{c(s,\ t)}{N}}{\left(\frac{\sum_{i=1}^{n} c(i,\ t)}{N}\right) \times \left(\frac{\sum_{j=1}^{m} c(s,\ j)}{N}\right)}\right) \quad (1)$$

where s and t denotes two tasks, respectively; c(s, t) denotes the number of same factors where exists both in task s and task t; n and m respectively denote the total number of total factors, and N denotes the number of tasks in the related task sets. Further, the task set comparator 520 may determine the relatedness (or the similarity) of the task set v to the task set s by (2) as below.

$$\tau(v,\ s) = \frac{\sum_{t \in \{x|f(v,x)>0\}} f(s,\ t)}{\sum_{t \in \{x|f(s,v)>0\}} f(s,\ t)} \quad (2)$$

where $\tau(v,\ s)$ denotes the relatedness of the task set v to the task set s. It is to be understood that the example calculations of the similarities are only for the purpose of illustration, without suggesting any limitations. The task set comparator 520 may use other methods or calculations to determine the similarities.

If the similarity (or relatedness) between a first task set and a second task set exceeds a threshold, the task set comparator 520 may select the first task set or the second task set to be the target task set. The threshold may be predetermined or dynamically adjusted according to customer preference or other criteria.

Alternatively, task set comparator 520 may also determine similarities between the plurality of task sets and further task sets of further source workflow stored in storage of the workflow management system 410. If the similarity between a first task set in the plurality of task sets and a further task set stored in the storage, task set comparator 520 may determine the first task set to be the target task set. For example, if task set comparator 520 determines that the similarity between the task set 720 in FIG. 7A and the task set 750 in FIG. 7B exceeds the threshold, task set comparator 520 may select the task set 720 to be the target task set for the source workflow 700 in FIG. 7A.

It is to be understood that the above mentioned methods regarding how to determine the target task set may be combined. For example, if the workflow management system 410 determines that a task set is a similar task set with another task set, and the task set includes a bottleneck, workflow management system 410 may determine the task set to be the target task set. It is to be understood that other appropriate method may be applied to determine the target task set. The scope of the present application will not be limited in this regard.

By selecting a target task set with a potential bottleneck of the source workflow, the workflow management system 410 may avoid the potential bottleneck in the source workflow. In addition, by selecting a target task set similar to another task set, the optimized task set for the selected target task set will be reused or shared with those similar task sets. In this way, the workflow optimization and re-distribution will be more efficient.

The workflow management system 410 may also include a task set optimizer 530. The task set optimizer 530 is configured to optimize the determined target task set. For example, the task set optimizer 530 may re-distribute the target task set to obtain at least one re-distributed task set for the target task set. Each re-distributed task set indicates a respective data path different from a data path of the target task set. The at least one re-distributed task set has a same function as the target task set. In some embodiments, the task set optimizer 530 may obtain all the possible re-distributed task sets for the target task set to further select an optimized task set.

The target task set may be re-distributed in any suitable methods. For example, the re-distributed task set may be obtained by converting the order of tasks in the target task set according to possible combination. When converting the order of tasks, pre-conditions and post-conditions of each task in the task set need to be considered. In some embodiments, the task set optimizer 530 may store information about the re-distributed task sets for the target task set. The task set optimizer may also search for the storage of the workflow management system 410 for previously stored re-distributed task sets for the target task set.

Figure 10:
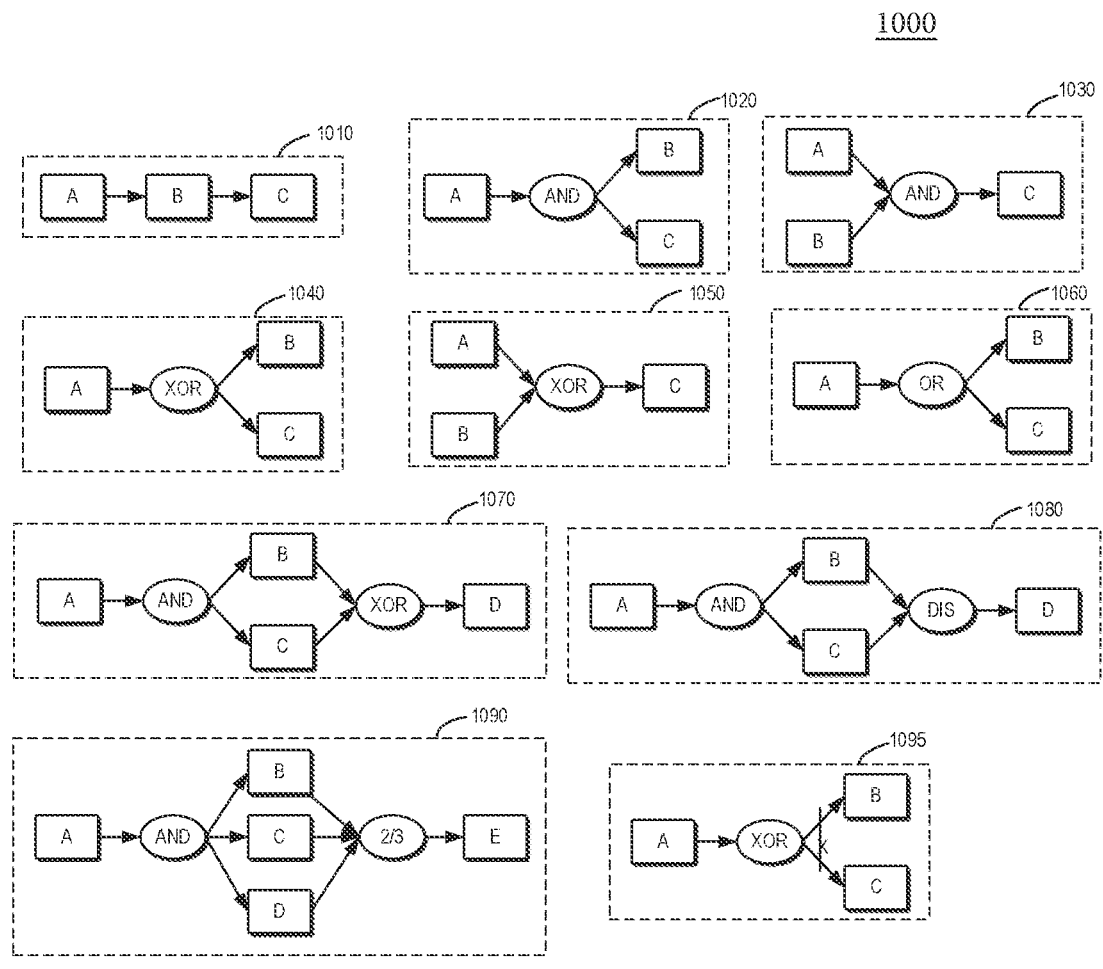
FIG. 10 depicts example re-distributed task sets for a target task set according to some embodiments of the present disclosure.

FIG. 10 shows diagram 1000 that depicts example re-distributed task sets 1010, 1020, 1030, 1040, 1050, 1060, 1070, 1080, 1090 and 1095 for a target task set according to some embodiments of the present disclosure. As illustrated, the order or relationships between the tasks in the re-distributed task may be varied. Additional tasks may be added in the re-distributed task set, as well. Tasks in the target task set may also be omitted in some example re-distributed task sets. It is to be understood that the example re-distributed task sets in FIG. 10 are only for the purpose of illustration, without suggesting any limitations.

In some embodiments, task set optimizer 590 may obtain simulated data flow of each re-distributed task set. For example, the workflow management system 410 may include a workflow data simulator 580 which is configured to transmit the simulated data flow (or simulated data flow information) to the task set optimizer 590. In some embodiments, when simulating the data flow, the workflow data simulator 580 may combine tasks into one running space. In addition, the workflow data simulator 580 may split one task into multiple subtasks to run. Moreover, the workflow data simulator 580 may re-distribute task to idle resource for running.

In some embodiments, the workflow data simulator 580 may set up the experimental design and determine a data generation model. The workflow data simulator 580 may generate simulated input data for the at least one re-distributed task set. The workflow data simulator 580 then may apply estimation methods to obtain simulated output data by inputting the simulated input data to the at least one data path indicated by the at least one re-distributed task set. In some embodiments, workflow data simulator 580 obtains the simulated data flow by collecting the simulated input data and the simulated output data along with data flow timeline information and optional resource consumption information for the at least one re-distributed task set.

In addition, workflow data simulator 580 obtains a performance summary for the re-distributed task set, and obtains a result for the re-distributed task set showing whether the re-distributed task set is a potential bottleneck.

In some operations, workflow data simulator 580 may store the simulated data flow in a JavaScript Object Notation (JSON) file. The JSON file may comprise an InputPath field, Parameters field, ResultSelector field, ResultPath field and OutputPath filed. For example, with the InputPath field, the workflow data simulator 580 selects which parts of the JSON input to pass to the task state. Step Functions applies the InputPath field first and then the Parameters field.

For the parameters field, workflow data simulator 580 may create a collection of key-value pairs that are passed as input to function. These parameter values may be static, or dynamically selected from either the state input or the workflow context object.

The workflow data simulator 580 may provide a way to manipulate the state's result before the ResultPath is applied. Similar to the parameters field, it allows to create a collection of key-value pairs. The output of ResultSelector replaces the state's result and is passed to ResultPath.

For ResultPath field, the workflow data simulator 580 may specify the output of a task before it is passed along to the OutputPath. Use the ResultPath to determine whether the output of a state is a copy of its input, the results it produces, or a combination of both.

For OutputPath field, the workflow data simulator 580 may filter the JSON provided by the TaskResult to limit the information that's passed to the task's final output.

Approaches regarding how to obtain the simulated data flow for the re-distributed task set have been described above. In some embodiments, workflow data simulator 580 transmits the simulated data flow to the task set optimizer 530. The task set optimizer 530 may receive the simulated data flow and check potential bottleneck based on the simulated data flow analysis. The task set optimizer 530 may determine an optimized task set for the target task set based on the simulated data flow for the at least one re-distributed task set.

In some embodiments, if resource consumption for completing a re-distributed task set is below a consumption threshold (that is, there is no bottleneck in the re-distributed task set), task set optimizer 530 determines this re-distributed task set to be the optimized task set. Alternatively, if a time duration for completing a re-distributed task set is below a time threshold (that is, no bottleneck in the re-distributed task set), the task set optimizer 530 may determine this re-distributed task set to be the optimized task set. It is to be understood that the consumption threshold and the time threshold may be predetermined or dynamically adjusted based on customer preference or other criteria. For a CPU intensive workflow, the consumption threshold may be set to a less value. For an I/O intensive workflow, the time threshold may be set to a shorter value.

In some embodiments, the task set optimizer 530 may analyze the simulated data flow for each re-distributed task set and select the one with a best performance to be the optimized task set. For example, the optimized task set may have a shortest time during for completing or may consume the least resource. It is to be understood that other methods or criteria may be applied by the task set optimizer 530 to select the optimized task set.

In some embodiments, task set optimizer 530 transmits the optimized task set to the workflow task set re-distributor 590. The workflow task set re-distributor 590 is configured to re-distribute the workflow based on analysis result data flow and task set optimizer 530. For example, the workflow task set re-distributor 590 may replace the target task set in the source workflow 401 by the optimized task set to obtain the target workflow 411.

In this way, the target task set with a potential bottleneck will be optimized to avoid the bottleneck. The source workflow will be optimized by using similarity check and multiple dimension comparison before deployment. Moreover, the resource will be better leveraged for workflow execution.

In some embodiments, the workflow task set re-distributor 590 considers the distribution of task set among public cloud and private cloud, either from order or processing place. For example, if the task set contains sensitive data, workflow task set re-distributor 590 will inform a workflow task publisher in the workflow management system 410 to publish the task set to private cloud. In contrast, if no sensitive data is contained in the task set, the workflow task set re-distributor 590 will inform the workflow task publisher to publish the task set to public cloud. In this way, sensitive data will be protected from leakage. Thus, optimized workflow can be efficiently shared without security risk.

In some embodiments, the re-distributed task set (also referred to as a revised task set) may be reused and shared for other workflow. For example, the task set comparator 520 may determine a further similarity between a further task set of a further workflow and the target task set (which has been re-distributed with a determined optimized task set). If the further similarity exceeds a threshold, the task set optimizer 530 may determine the optimized task set for the target task set to be an optimized task set for the further task set. In addition, the workflow task set re-distributor 590 may re-distribute the further workflow based on the optimized task set for the target task set.

In this way, the previously revised or optimized task set will be reused in other workflows. Thus, calculations will be reduced, and overall time consumption will be reduced as well.

Examples regarding optimization and re-distribution topology of workflow in hybrid cloud have been described in detail with respect to FIGS. 4-10 above. FIG. 11 depicts a flowchart of an example method 1100 for workflow optimization and re-distribution according to some embodiments of the present disclosure. The method 1100 can be implemented at the workflow management system 410 of FIGS. 4 and 5. For the purpose of discussion, method 1100 will be described from the perspective of the workflow management system 410 with reference to FIGS. 4 and 5.

At block 1110, the workflow management system 410 determines a target task set from a plurality of tasks included in a workflow based on a data flow of the workflow. At block 1120, the workflow management system 410 re-distributes the target task set to obtain at least one re-distributed task set for the target task set. Each re-distributed task set indicates a respective data path different from a data path of the target task set. The at least one re-distributed task set has a same function as the target task set. At block 1130, the workflow management system 410 obtains a simulated data flow for the at least one re-distributed task set by simulating data flowing in at least one data path indicated by the at least one re-distributed task set. At block 1140, the workflow management system 410 determines an optimized task set for the target task set based on the simulated data flow for the at least one re-distributed task set.

In some embodiments, to determine the target task set, the workflow management system 410 groups the plurality of tasks of the workflow into a plurality of task sets based on the data flow of the workflow and a knowledge base. The workflow management system 410 further selects the target set from the plurality of task sets. In some embodiments, the workflow management system 410 groups the plurality of tasks into the plurality of task sets based on at least one of: operators of the plurality of tasks or functions of the plurality of tasks.

In some embodiments, to select the target task set, in accordance with a determination that a time duration for completing a task set of the plurality of task sets exceeds a time threshold, the workflow management system 410 determines the task set as the target task set. Alternatively, to select the target task set, in accordance with a determination that resource consumption for completing the task set exceeds a consumption threshold, the workflow management system 410 determines the task set as the target task set.

In some embodiments, to select the target task set, workflow management system 410 determines similarities among the plurality of task sets based on the data flow of the workflow. In accordance with a determination that a similarity between a first task set and a second task set exceeds a threshold, the workflow management system 410 further determines the first task set or the second task set to be the target task set. In some embodiments, to determine the similarities, for each task set of the plurality of task sets, the workflow management system 410 obtains input data and output data of the task set by intercepting a request to the task set; aggregates a data metric for the task set based at least in part on the input data and output data of the task set; and obtains data flow timeline information of the task set. The workflow management system 410 further determines the similarities based on the data metrics and the data flow timeline information of the plurality of task sets.

In some embodiments, the workflow management system 410 aggregates the data metric for the task set based on the input data and output data of the task set, pre-conditions and post-conditions of the task set and task implementations of the task set.

In some embodiments, to obtain the simulated data flow for the at least one re-distributed task set, workflow management system 410 generates simulated input data for the at least one re-distributed task set; obtains simulated output data by inputting the simulated input data to the at least one data path indicated by the at least one re-distributed task set; and obtains the simulated data flow by collecting the simulated input data and the simulated output data along with data flow timeline information and resource consumption information for the at least one re-distributed task set.

In some embodiments, in accordance with a determination that a time duration for completing the at least one re-distributed task set is below a time threshold, the workflow management system 410 determines the optimized task set by setting the at least one re-distributed task set to be the optimized task set. Alternatively, in some embodiments, in accordance with a determination that resource consumption for completing the at least one re-distributed task set is below a consumption threshold, the workflow management system 410 determines the optimized task set by setting the at least one re-distributed task set to be the optimized task set.

In some embodiments, the data flow of the workflow comprises at least one of: input data of tasks in the workflow; output data of tasks in the workflow; pre-conditions of tasks in the workflow; post-conditions of tasks in the workflow; timeline information of tasks in the workflow or resource consumption information of tasks in the workflow.

In some embodiments, workflow management system 410 further determines a further similarity between a further task set of a further workflow and the target task set. If the further similarity exceeds a threshold, the workflow management system 410 re-distributes the further task set of the further workflow based on the optimized task set.

It should be noted that the processing of workflow optimization and re-distribution according to embodiments of this disclosure could be implemented by computer system/server 12 of FIG. 1.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some helpful definitions for understanding embodiments of the present invention are provided below.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/of" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
determining a target task set from a plurality of tasks included in a workflow based on a data flow of the workflow;
determining similarities among the plurality of tasks based on the data flow of the workflow, wherein a task similarity is calculated by leveraging input/output pattern data from an intercepted request from the target task set;
selecting the target task set with a potential bottleneck of the workflow, wherein the potential bottleneck comprises intensive input/output pattern data of the target task set;
re-distributing the target task set before deployment to avoid the potential bottleneck and to obtain at least one re-distributed task set for the target task set, wherein the at least one re-distributed task set indicates a respective data path different from a data path of the target task set, and wherein the at least one re-distributed task set has a same function as the target task set;
determining an optimized task set for the target task set based on data flow simulation and analysis; and
executing the workflow by sharing the optimized task set without a potential security risk.

2. The method of claim 1 wherein determining the target task set further includes:
grouping the plurality of tasks of the workflow into a plurality of task sets based on the data flow of the workflow and a knowledge base; and selecting the target task set from the plurality of task sets.

3. The method of claim 2, wherein selecting the target task set further includes:
determining the task set as the target task set based, at least in part, upon a determination that a time duration for completing the task exceeds a time threshold and/or a determination that a resource consumption for completing the task exceeds a consumption threshold.

4. The method of claim 2, wherein grouping the plurality of tasks into the plurality of task sets further includes:
grouping the plurality of tasks into the plurality of task sets based, at least in part, upon operators of the plurality of tasks and/or functions of the plurality of tasks.

5. The method of claim 2, wherein selecting the target task set further includes:
determining similarities among the plurality of task sets based on the data flow of the workflow; and
in accordance with a determination that a similarity between a first task set and a second task set exceeds a threshold, determining the first task set or the second task set to be the target task set.

6. The method of claim 5, wherein determining the similarities includes:
for each task set of the plurality of task sets:
obtaining input data and output data of the task set by intercepting a request to the task set;
aggregating a data metric for the task set based at least in part on the input data and output data of the task set;
obtaining data flow timeline information of the task set; and determining the similarities based on the data metrics and data flow timeline information of the plurality of task sets.

7. The method of claim 6, wherein aggregating the data metric for the task set includes:
aggregating the data metric based on the input data and output data of the task set, pre-conditions and post-conditions of the task set and task implementations of the task set.

8. The method of claim 1, wherein obtaining the simulated data flow for the at least one re-distributed task set further includes:
generating simulated input data for the at least one re-distributed task set;
obtaining simulated output data by inputting the simulated input data to the at least one data path indicated by the at least one re-distributed task set; and
obtaining the simulated data flow by collecting the simulated input data and the simulated output data along with data flow timeline information and resource consumption information for the at least one re-distributed task set.

9. The method of claim 1, wherein determining the optimized task set further includes:
determining the at least one re-distributed task set to be the optimized task set based, at least in part, upon a determination that a time duration for completing the at least one re-distributed task set is below a time threshold and/or a determination that resource consumption for completing the at least one re-distributed task is below a consumption threshold.

10. The method of claim 1, wherein the data flow of the workflow includes: (i) input data of tasks in the workflow; (ii) output data of tasks in the workflow; (iii) pre-conditions of tasks in the workflow; (iv) post-conditions of tasks in the workflow; (v) timeline information of tasks in the workflow; and/or (vi) resource consumption information of tasks in the workflow.

11. The method of claim 1, further comprising:
determining a further similarity between a further task set of a further workflow and the target task set; and
in accordance with a determination that the further similarity exceeds a threshold, re-distributing the further task set of the further workflow based on the optimized task set.

12. A computer system comprising:
a processing unit; and
a memory coupled to the processing unit and storing instructions thereon, the instructions, when executed by the processing unit, performing operations including:
determining a target task set from a plurality of tasks included in a workflow based on a data flow of the workflow;
determining similarities among the plurality of tasks based on the data flow of the workflow, wherein a task similarity is calculated by leveraging input/output pattern data from an intercepted request from the target task set;
selecting the target task set with a potential bottleneck of the workflow, wherein the potential bottleneck comprises intensive input/output pattern data of the target task set;
re-distributing the target task set before deployment to avoid the potential bottleneck and to obtain at least one re-distributed task set for the target task set, wherein the at least one re-distributed task set indicates a respective data path different from a data path of the target task set, and wherein the at least one re-distributed task set has a same function as the target task set;

determining an optimized task set for the target task set based on data flow simulation and analysis; and executing the workflow by sharing the optimized task set without a potential security risk.

13. The computer system of claim 12 further comprising:

grouping the plurality of tasks of the workflow into a plurality of task sets based on the data flow of the workflow and a knowledge base; and selecting the target task set from the plurality of task sets.

14. The computer system of claim 13 wherein selecting the target task set further includes:

determining the task set as the target task set based, at least in part, upon a determination that a time duration for completing a task of the plurality of task sets exceeds a time threshold and/or a determination that resource computation for completing the task set exceeds a consumption threshold.

15. The computer system of claim 13, wherein grouping the plurality of tasks into the plurality of task sets further includes:

grouping the plurality of tasks into the plurality of task sets based, at least in part, upon operators of the plurality of tasks and/or functions of the plurality of tasks.

16. The computer system of claim 13, wherein selecting the target task set further includes:

determining similarities among the plurality of task sets based on the data flow of the workflow; and in accordance with a determination that a similarity between a first task set and a second task set exceeds a threshold, determining the first task set or the second task set to be the target task set.

17. The computer system of claim 16, wherein determining the similarities further includes:

for each task set of the plurality of task sets:

obtaining input data and output data of the task set by intercepting a request to the task set;

aggregating a data metric for the task set based at least in part on the input data and output data of the task set;

obtaining data flow timeline information of the task set; and determining the similarities based on the data metrics and data flow timeline information of the plurality of task sets.

18. The computer system of claim 12, wherein obtaining the simulated data flow for the at least one re-distributed task set further includes:

generating simulated input data for the at least one re-distributed task set;

obtaining simulated output data by inputting the simulated input data to the at least one data path indicated by the at least one re-distributed task set; and obtaining the simulated data flow by collecting the simulated input data and the simulated output data along with data flow timeline information and resource consumption information for the at least one re-distributed task set.

19. The computer system of claim 12, wherein determining the optimized task set further includes:

determining the at least one re-distributed task set to be the optimized task set based, at least in part, upon a determination that a time duration for completing the at least one re-distributed task set is below a time threshold and/or a determination that resource consumption for completing the at least one re-distributed task is below a consumption threshold.

20. A computer program product comprising:

a machine-readable storage device; and computer code stored on the machine-readable storage device, with the computer code including instructions and data for causing a processor(s) set to perform operations including the following:

determining a target task set from a plurality of tasks included in a workflow based on a data flow of the workflow;

determining similarities among the plurality of tasks based on the data flow of the workflow, wherein a task similarity is calculated by leveraging input/output pattern data from an intercepted request from the target task set;

selecting the target task set with a potential bottleneck of the workflow, wherein the potential bottleneck comprises intensive input/output pattern data of the target task set;

re-distributing the target task set before deployment to avoid the potential bottleneck and to obtain at least one re-distributed task set for the target task set, wherein the at least one re-distributed task set indicates a respective data path different from a data path of the target task set, and wherein the at least one re-distributed task set has a same function as the target task set;

determining an optimized task set for the target task set based on data flow simulation and analysis; and executing the workflow by sharing the optimized task set without a potential security risk.

* * * * *